June 23, 1953  E. E. FIELDS  2,642,838
LIVESTOCK FEEDER
Filed July 10, 1950
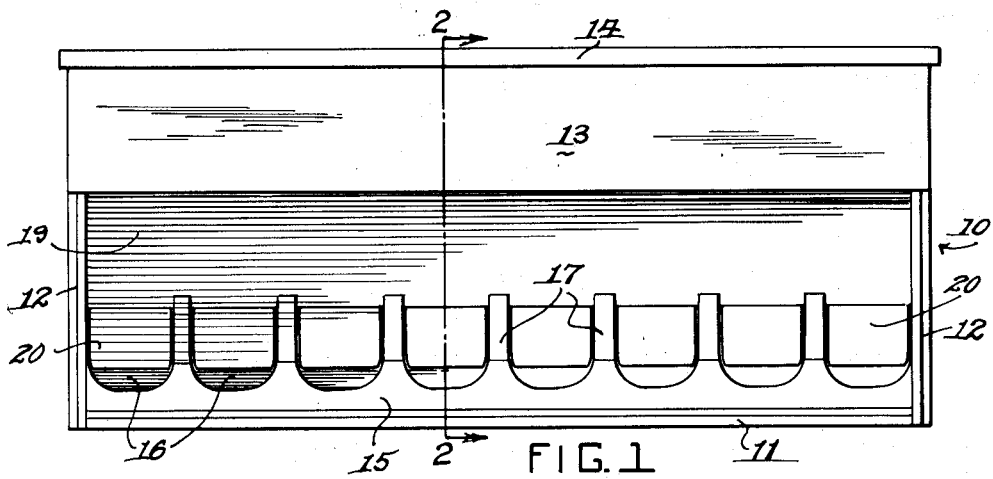
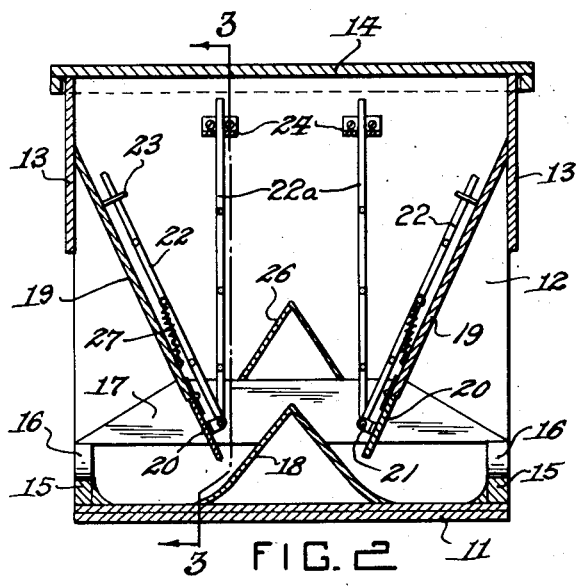
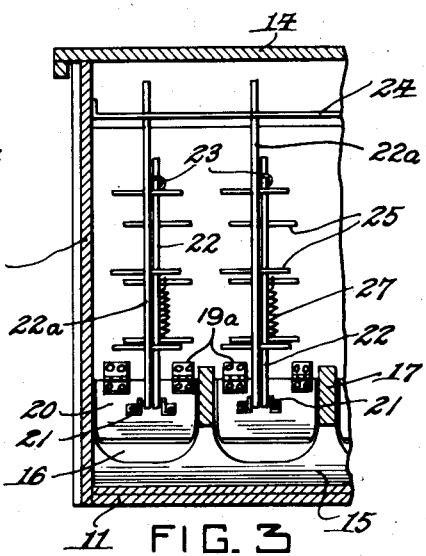
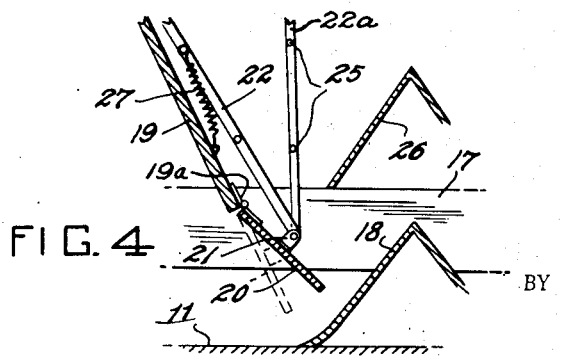
INVENTOR
*ELTA E. FIELDS*
BY *W. S. McDowell*
ATTORNEY Patented June 23, 1953

2,642,838

UNITED STATES PATENT OFFICE 2,642,838

LIVESTOCK FEEDER

Elta E. Fields, Marion, Ohio

Application July 10, 1950, Serial No. 172,974

2 Claims. (Cl. 119—53.5)

The present invention relates to animal feeding apparatus of the type adapted to receive and store a relatively large quantity of feed, such as grain or other stock food, and to dispense portions of the stored feed into individual trough compartments for the simultaneous feeding of a number of animals. More specifically, the present invention deals with an improved livestock feeder of the type comprising a relatively large rectangular storage bin having along the lower side edges thereof a plurality of trough compartments into which extend a like number of hingedly mounted door-type levers arranged to be moved by the insertion of the noses of animals within the troughs to cause the discharge of a quantity of feed from a main storage compartment within the feeder into the separate trough sections.

In the past, numerous livestock feeders have been proposed which generally comprise a rectangular storage box into which feed may be introduced, and which are provided with a plurality of separate feeding troughs having trap doors associated therewith to control the flow or passage of feed from the main storage chamber of the feeder to the individual feeding troughs. However, with respect to previously known feeder constructions, the same have heretofore been subject to numerous objectionable features, primarily with respect to the mechanisms of the feeder by which the separate amounts of feed were caused to pass from the storage hopper into the separate feeding troughs of the feeder. Generally, the prior art constructions provided actuating doors or levers which extended into the individual feeding troughs, and to which were connected one or more agitating devices extending within the main storage chamber of the feeder and movable upon movement of the associated trap doors to cause the passage of feed from the main storage chamber to the individual compartments of the feeder. In most instances, the trap door arrangement was such as to prevent or restrict the proper flow of feed into the individual feeding troughs, or conversely, to permit an overflow of feed from the storage hopper to the individual compartments, thereby wasting feed and permitting the same to remain within the individual trough compartments after the animals had eaten their fill.

It follows, therefore, that the primary object of the present invention is to generally improve upon previous types of livestock feeders through the provision of a novel feeder construction and valve mechanism whereby the flow of feed from the main storage chamber or hopper of the feeder is controlled in accordance with the desires of an animal feeding at the trough.

It is another object of this invention to provide an improved valving system for livestock feeders which functions to release substantially measured amounts of feed into a plurality of individual feeding troughs or compartments, and which functions to preclude overflowing of the feeding compartments and consequent waste of food.

Yet another object of this invention is to provide an improved livestock feeder wherein the main storage compartment of the feeder is defined at its lower end by a plurality of convergent walls terminating on either side of the feeder in relatively restricted discharge openings of a size to normally restrict the flow of feed from the main storage compartment to the individual feeding troughs in the absence of positive agitation of a valving system which includes a swinging door extending within each of the individual feeding troughs in a manner to be struck and agitated by movement of the nose of an animal within each of the separate feeding troughs.

For a further and more detailed understanding of the present invention and the various additional objects and advantages realized therefrom, reference is made to the following description and the accompanying drawing, wherein:

Fig. 1 is a side elevational view of a livestock feeder formed in accordance with the present invention;

Fig. 2 is a transverse vertical sectional view taken along the plane indicated by the line 2—2 of Fig. 1;

Fig. 3 is a fragmentary longitudinal vertical sectional view taken along the plane indicated by the line 3—3 of Fig. 2; and Fig. 4 is a detailed fragmentary sectional view of one of the valving mechanisms of Fig. 2 showing an adjusted position.

Referring now to the drawing, the numeral 10 designates generally the present feeder which comprises a bottom wall 11, end walls 12, partial side walls 13, and a removable top wall or cover 14. On either side of the bottom wall 11 there is positioned an upstanding compartmentating web 15 which extends longitudinally of the feeder, and which is notched, as at 16, to provide a plurality of recessed regions into which the noses of animals may extend to gain access to the individual feeding troughs. On either side of the recesses 16 formed in the upstandings webs 15 are positioned a plurality of transversely extending compartmentating webs 17 which divide the feeder transversely into a plurality of individual feeding troughs disposed along the lower sides of the feeder. The lower wall 11 of the feeder is provided longitudinally and centrally with an inverted V-shaped web 18 which forms a back wall for the individual feeding troughs. The V-shaped web 18 projects upwardly into the rectangular feeder along the longitudinal center line thereof and serves to direct feed from the upper portion of the feeder into the individual troughs, as will be hereinafter more fully described.

Extending diagonally inwardly and downwardly from the partial side walls 13, and between the ends walls 12 of the feeder, are a pair of convergent hopper-forming walls 19 which define with the end walls 12 an internal storage hopper or feed manifold. The downwardly inclined walls 19 terminate a distance above the lower wall 11 of the feeder, and are supported at their lower ends by the transversely extending webs 17. Hingedly connected with the lower edges of the walls 19, as by means of the hinges 19a, are a plurality of swinging door-type levers 20 which extend into the individual feeding compartments or troughs of the feeder between the transverse webs 17 and the end walls 12. The door-type levers 20 extend outwardly within the individual feeding troughs and terminate in spaced relation to the inverted V-shaped web 18 of the bottom wall. Carried upon the inner side surfaces of each of the door-type levers 20 is an attachment bracket 21 to which is pivotally connected the lower end of a pair of agitator arms or shafts 22 and 22a. The agitator shaft 22 associated with each of the door-type levers 20 extends upwardly in substantially parallel relation to the walls 19, and is slidably supported at its upper end within an eyelet 23 carried by the upper portion of the wall 19. The other agitator shaft 22a extends substantially vertically upwardly within the feed manifold of the feeder and is guided for vertical movement by longitudinal guide strips 24 extending longitudinally of the feeder between the end walls 12. Each of the agitator shafts 22 and 22a is provided with a plurality of laterally extending prongs 25 which function, upon movement of the shafts, to disturb the feed located in the upper regions of the feeder and cause the same to flow downwardly between the walls 19 and a second inverted V-shaped compartmentating wall or web 26 which is supported by the end walls 12 and disposed in vertically spaced relation to the bottom V-shaped web 18 to divide the feed manifold longitudinally of its length into two separate passageways. The lower ends of the V-shaped compartmentating web 26 are spaced from the lower ends of the side walls 19 to provide relatively restricted passages into the separate feed compartments. Additionally, the lower portions of the agitator shafts 22 and 22a serve to further restrict the individual openings between the feed manifold and the troughs, whereby a natural bridging of the feed positioned within the upper region of the feeder takes place between the V-shaped web 26 and the lower ends of the inclined walls 19. The door-type levers 20 are pivotally mounted so as to move inwardly when nudged or pushed by the nose of the animal feeding within one of the trough compartments. The inward movement of the door-type levers 20, in turn, imparts upward reciprocating movement to the individual agitator shafts 22 and 22a to thereby loosen the bridge of grain or feed above each of the troughs and cause the feed to pass downwardly onto the V-shaped web 18 and thence outwardly into the separate troughs. It will be understood that the flow of feed to the individual compartments is controlled only by the door-type lever 20 associated with that particular compartment. Thus, movement of one of the doors 20 only causes the flow of grain or feed into its individual compartment, and does not disturb the operation or flow of feed into the remaining compartments of the feeder.

In operation, as the door-type levers 20 are moved inwardly by the nose of an animal, the grain or feed slides downwardly into the compartment where it is consumed by the animal. If the hunger of the animal remains unabated after eating the first discharge of feed, the door 20 may then be nudged by the nose of an animal to discharge a second quantity of feed into the compartment, and so on until the appetite of the animal is satisfied. Connected with each of the inclined agitator shafts 22 and 22a is one end of a coil expansion spring 27 which has its opposite end secured to the inner surface of the wall 19 in a manner to urge the agitator shafts downwardly toward their Fig. 2 position. In their downward positions, the shafts 22 and 22a maintain the door-type levers 20 in longitudinal alignment with the walls 19, as shown in Fig. 2, in which position feed introduced through the top of the feeder will form a natural bridge between the walls 19 and the inverted V-shaped compartmentating web 26. Upon movement of the door-type levers 20 inwardly to a position as indicated in full lines in Fig. 4, the expansion springs 27 are stretched to permit upward movement of the agitator shafts 22 and a consequent discharge of feed onto the V-shaped bottom wall extension 18. The springs 27 function to return the door-type levers to their original positions well within each of the separate feeding troughs.

In view of the foregoing, it will be seen that the present invention provides an improved type of livestock feeder comprising a substantially rectangular box-like body which is formed in its upper region to receive a relatively large quantity of grain or other suitable feed, and which is provided at its lower side regions with a plurality of separate feeding compartments into which regulated amounts of feed may flow by actuation of the valving mechanism by the nose of the animal feeding in the individual trough compartments. Feeders formed in accordance with the present invention are characterized by their efficiency in preventing undue waste of feed, while at the same time insuring an ample supply of feed within the individual trough compartments in accordance with the desires of a feeding animal.

While a single preferred construction has been disclosed in detail, it will be understood that various modifications in construction may be resorted to without departing from the spirit of the invention or the scope of the following claims.

I claim:

1. In a livestock feeder; a substantially rectangular bin formed with a hopper body defined by a pair of relatively spaced upstanding end walls and a pair of downwardly inclined convergent side walls; an inverted V-shaped compartmentating wall extending longitudinally of said hopper in spaced relation to the lower ends of the downwardly inclined side walls thereof, said compartmentating wall defining with the side walls of said hopper a pair of relatively restricted discharge passageways; a bottom wall disposed in vertically spaced relation to the lower ends of the side walls of said hopper and provided with an inverted V-shaped central portion extending longitudinally of the bottom wall in vertically spaced relation to said compartmentating wall, said inverted V-shaped portion of said bottom wall being disposed in spaced relation to the discharge passageways of said hopper and arranged to direct materials discharged from said hopper laterally toward the sides of said bin; means extending transversely of the bottom wall of said bin and dividing the latter into a plurality of separate feeding troughs; a plurality of swinging doors extending within each of the feeding troughs of said bin and hingedly connected with the lower ends of the side walls of said hopper, said doors being arranged to move inwardly and upwardly with respect to each feeding trough in response to abutment by the nose of an animal feeding within each trough; and agitator means pivotally connected with each of said doors and extending upwardly through one of the discharge passageways of said hopper in the vertical plane of its associated door and movable with said door to loosen material received within said hopper and bridging the discharge passages thereof immediately above said door, whereby to permit a portion of material disposed above said door to gravitate downwardly into the feeding trough into which said door extends.

2. In a livestock feeder; a substantially rectangular bin formed with spaced vertically arranged end walls, a bottom wall, and partial side walls extending downwardly from the upper edges of said end walls and terminating in spaced relation to said bottom wall; a pair of longitudinally extending downwardly inclined hopper-forming walls carried between the end walls of said bin and terminating at their lower ends in spaced relation to said bottom wall; a compartmentating web extending longitudinally of said bin and having outwardly divergent walls terminating in transversely spaced relation to the lower ends of said hopper-forming walls, said compartmentating web defining with the hopper-forming walls a pair of longitudinally extending, relatively restricted discharge passages; an inverted V-shaped web extending upwardly from the central region of said bottom wall in vertically spaced relation to said compartmentating web, said inverted V-shaped web being arranged below the discharge passages of said hopper for directing materials discharged through said passages laterally and outwardly of said bottom wall; a plurality of transversely extending walls carried by said bottom wall and dividing the latter into a plurality of separate feeding troughs; a door extending downwardly within each of the separate feeding troughs and hingedly united with the lower ends of said hopper-forming walls for swinging movement inwardly and upwardly with respect to said bottom wall; and a pair of agitator shafts carried by each of said doors and extending upwardly through the discharge passages of said hopper immediately above its associated door, said door and shafts being movable to loosen materials received within said hopper and bridging said passages immediately above said door to cause gravitational flow of material through said passages and into the feeding trough into which said door extends.

ELTA E. FIELDS.

References Cited in the file of this patent

UNITED STATES PATENTS

| Number | Name | Date |
|---|---|---|
| 1,290,373 | Shaw | Jan. 7, 1919 |
| 1,322,698 | Johnson | Nov. 25, 1919 |
| 2,522,635 | Pittenger et al. | Sept. 19, 1950 |

FOREIGN PATENTS

| Number | Country | Date |
|---|---|---|
| 86,705 | Switzerland | Nov. 16, 1920 |